(12) United States Patent
Boice et al.

(10) Patent No.: US 6,301,671 B1
(45) Date of Patent: Oct. 9, 2001

(54) APPARATUS AND METHOD FOR POWER REDUCTION CONTROL IN A VIDEO ENCODER DEVICE

(75) Inventors: Charles Edward Boice; John Mark Kaczmarczyk, both of Endicott; John Ashley Murdock, Apalachin; Michael Patrick Vachon, Johnson City; Robert Leslie Woodard, Newark Valley, all of NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/046,287

(22) Filed: Mar. 23, 1998

(51) Int. Cl.[7] .................................................. G06F 1/32
(52) U.S. Cl. ........................................ 713/322; 713/601
(58) Field of Search .................................. 713/300, 320, 713/322, 324, 601

(56) References Cited

U.S. PATENT DOCUMENTS

| | | | |
|---|---|---|---|
| 5,452,434 | * | 9/1995 | MacDonald ............................ 713/322 |
| 6,028,631 | * | 2/2000 | Nakaya et al. ........................ 348/384 |
| 6,079,022 | * | 6/2000 | Young ................................... 713/300 |
| 6,088,807 | * | 7/2000 | Maher et al. .......................... 713/324 |
| 6,173,408 | * | 1/2001 | Jimbo et al. .......................... 713/322 |

* cited by examiner

Primary Examiner—Glenn A. Auve
(74) Attorney, Agent, or Firm—Scully, Scott, Murphy & Presser

(57) ABSTRACT

System for reducing power consumption in MPEG-2 compliant video encoder circuitry employs logic for controlling first clock signals input to functional I, HSU and RSU blocks and functional sub-units performing specific tasks therein. Second clock signals are continuously input to a processing detection circuits requiring continuous clock inputs throughout video encode operations for a functional sub-unit. A trigger signal is asserted by the sub-unit itself or, an external processor, to indicate idle or active processing for that particular sub-unit. The combination of the second clock signals and receipt of the trigger signal enable the sub-unit to generate a sleep signal for that sub-unit which is input to a clock control circuit to either enable input of first clock signals to the functional sub-unit during active processing or, disable input of the first clock signal during idle, in-active processing periods, for as long as the trigger signal is asserted. There are a variety of video input conditions that may be detected which will enable generation of a trigger signal indicating idle processing for one or more functional sub-units, including, for example, detection of still input pictures, fade sequences and specification of high bitstream output rates.

27 Claims, 7 Drawing Sheets

APPARATUS AND METHOD FOR POWER REDUCTION CONTROL IN A VIDEO ENCODER DEVICE

BACKGROUND OF THE INVENTION

1. Field of the Invention

The present invention relates generally to video encoder devices, and particularly, to a methodology for reducing power consumption in MPEG-2 compliant video encoder circuits.

2. Discussion of the Prior Art

Due to the amount of computations required, MPEG-2 hardware video encoders require many logic circuits, resulting in large amounts of power consumption. For instance, studies have demonstrated that clocks provided per functional unit of a device consume 41%–73% of the total average power consumed by that functional unit, largely due to the difference between the clock switching factor and the random logic switching. This large power requirement translates to a need for extra assistance with dissipating heat, which may require additional board space and more aggressive cooling techniques such as large heat sinks and more fans. Devices consuming large amounts of power thus require more carefully designed circuits, increasing the cost of the chip and printed circuit board, and the final product in which it is housed.

For example, in a typical video encoder, on-chip memory arrays are provided. In traditional implementations of on-chip array elements, a free running oscillator 11 is usually provided as the clock input to the array 10, as generally shown in FIG. 1. Every transition of the oscillator results in the switching of a number of internal array nodes (the actual number being dependent on the design details of the array element itself) regardless of whether a read or a write was performed during the given cycle. For instance, transitions of array data and address lines between read/write cycle occur when the registers feeding the data and address lines of the on-chip array are fed with a free running (non-gated) oscillator and the data input to these registers changes for reasons other than prior to performing an array read/write. If the address register has a free running clock, each nodal transition in turn results in power dissipation.

Prior art techniques for reducing power consumption in electronic devices include the switching on/off of power supply voltages and/or clock signals to various devices when they are not used. U.S. Pat. No. 5,461,266 describes a typical technique for achieving reduced power consumption in computers by implementing a clock supply control device having the ability to stop or commence clock input to individual device components. However, the clock control device described in U.S. Pat. No. 5,461,266 implements a processor that requires many machine cycles to check the status of flags contained in an elaborate look-up table generated for tracking when a component has been brought to an unused condition before initiating stopping of the clock supply to that individual component.

It would be highly desirable to provide a computationally intensive video encoder such as an MPEG-2 video encoder with a power reduction methodology that is simple to implement, requiring minimal logic.

It would be further desirable to provide a methodology and apparatus for reducing power consumption of on-chip memory arrays in devices such as MPEG-2 compliant encoders.

SUMMARY OF THE INVENTION

An object of the present invention is to provide a technique for reducing power consumption in MPEG-2 video encoder devices.

A further object of the present invention is to provide a technique for reducing power consumption in MPEG-2 video encoder devices by asserting clocks only when circuit logic requires them.

Still further, an object of the present invention is to provide a technique for reducing power consumption in MPEG-2 video encoder devices that disables clocks input to certain motion estimation/compensation circuitry when the motion estimation/compensation process is not being performed.

Still another object of the invention is to provide gating of a register clock input to on-chip memory arrays.

Yet another object of the invention is to provide a way to change the contents of address/data registers only when needed.

In accordance with the principles of the invention, there is provided a system for reducing power consumption in video encoder circuitry having active processing circuitry receiving first clock signals, the system comprising: a circuit implementing logic for generating a first signal indicating either an active encode processing period in a functional sub-unit of said video encoder for a current video encode operation or, indicating an idle processing period; processing detection circuitry continuously receiving second clock signals and implementing logic for generating a second signal in response to receipt of a first signal indicating idle processing periods; and, clock control circuitry responsive to the second signal for disabling input of the first clock signals to the active data processing circuitry during the idle processing periods, while concurrently enabling the second clock signals to be input to the processing detection circuitry, whereby power consumption is reduced in the active processing circuitry during the idle periods.

Advantageously, the methodology promotes the operation of logic circuits of an MPEG-2 video at a lower temperature, thus increasing product reliability. Furthermore, applications such as camcorders that require lower power will benefit from a power reduction apparatus implemented in an MPEG-2 compliant video encoder.

BRIEF DESCRIPTION OF THE DRAWINGS

Further features and advantages of the invention will become more readily apparent from a consideration of the following detailed description set forth with reference to the accompanying drawings, which specify and show preferred embodiments of the invention, wherein like elements are designated by identical references throughout the drawings; and in which.

DETAILED DESCRIPTION OF THE INVENTION

The present invention relates to a methodology and apparatus for achieving a reduction in power consumption in an MPEG-2 compliant encoder device. By partitioning the MPEG encoding elements according to function and recognizing that certain functional units need not be operating at certain times, a reduction in power consumption is achieved. As will be explained, this can be achieved by manipulating clock signals that are input to those functional units.

Figure 2:
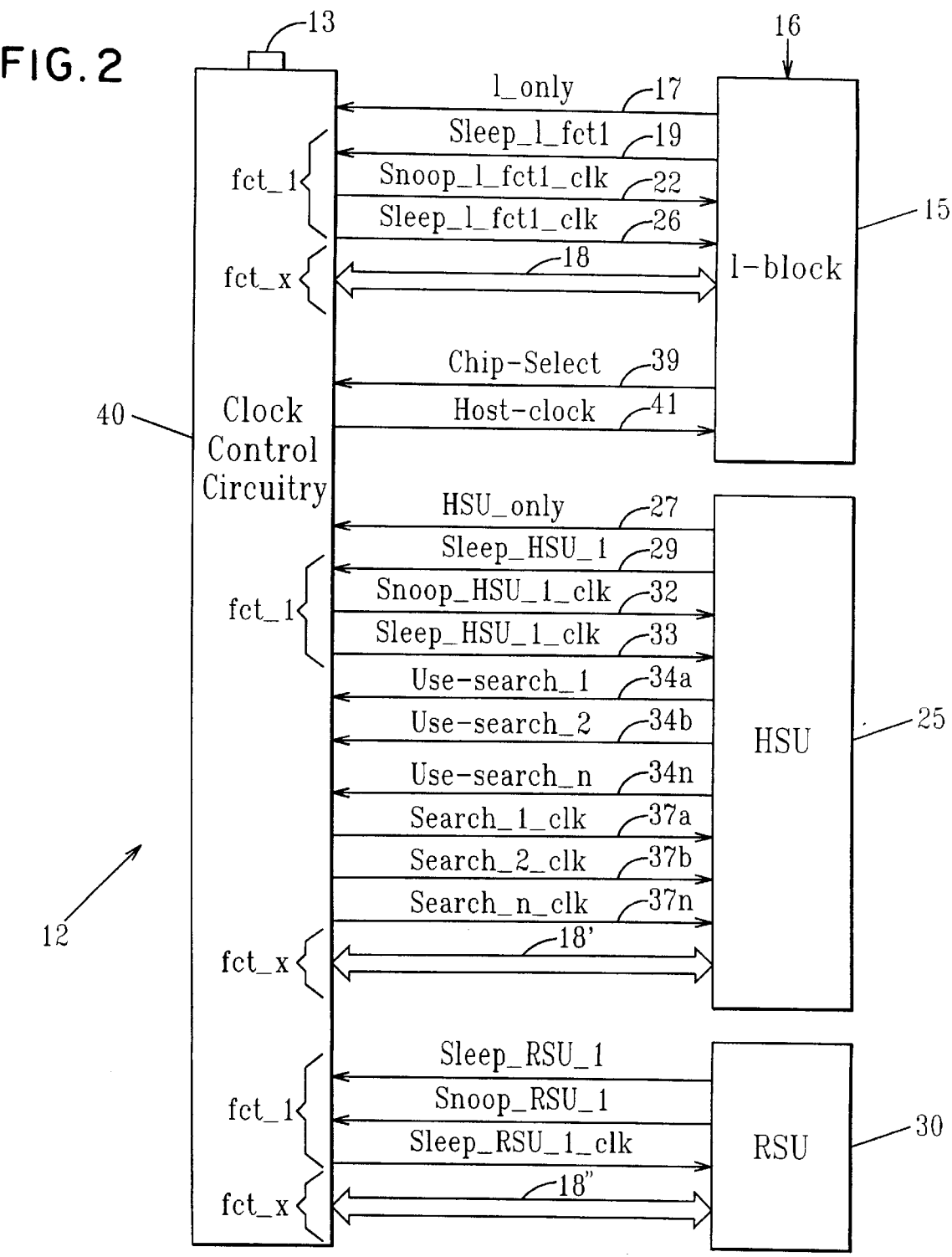
FIG. 2 is a logic diagram illustrating functional partitions of an MPEG-2 compliant video encoder including clock control circuitry implementing the methodology of the invention.

FIG. 2 illustrates a block diagram of a portion of the video encoder device 12 having an Intra-block partition 15 ("I") generally for performing intra-block MPEG encoding and including, e.g., DCT, Quantization, Variable Length Coding sub-units, a Hierarchical Search Unit 25 ("HSU") generally for performing hierarchical searching during MPEG motion estimation/compensation and including, inter alia, motion estimation sub-units, and a Refinement Search Unit 30 ("RSU") generally for performing refined searching during MPEG motion estimation/compensation and including, inter alia, inverse Quantization, inverse DCT and Motion estimation/compensation sub-units. Preferably, such a device is incorporated with other components (not shown) in an MPEG video encoder to be used in those applications requiring MPEG-2 video generation and transmission. The operation of each of these blocks are well-known to skilled artisans, and a general description of one particular MPEG-2 encoder can be found in greater detail in U.S. patent application Ser. No. 08/948,442, now U.S. Pat. No. 6,040,861 and U.S. patent application Ser. No. 08/996,856, now U.S. Pat. No. 6,198,772 both assigned to the same assignee as the present invention and the contents and disclosure of which are incorporated by reference as if fully set forth herein. Further shown in FIG. 2 is a clock control circuit 40 that generates one or more individual clock signals for each functional sub-units contained in the I, HSU, and RSU in accordance with clock enable information provided by the individual sub-units. The clock signals generated by clock control unit 40 are basically derived from a free-running oscillator 13 and operate as required by the individual processing components.

As is generally known, MPEG encoding is available in a variety of operating modes, and as such, may or may not require the operation of one or more of these sub-units. For instance, in a full-functional mode, I,P and B pictures are processed by the MPEG-2 encoder and consequently, all I, HSU and RSU sub-units are operable. During I_frame only video processing, the motion estimation/compensation functions in the HSU and RSU blocks may be disabled. Likewise, in a search only mode with motion estimation search enabled, only the HSU_block may be required. In accordance with the invention, each of the separate functional partitions I, HSU and RSU of the encoder 12 as shown in FIG. 2, are independent from each other and may have their clocks disabled during a certain period of processing, e.g., when they are not needed for the current operating mode. As will be explained, this is controlled through clock control circuitry 40 which evaluates operating modes and disables the clocks that are not required.

In a first embodiment of the invention, the encoder 12 is functionally partitioned as I, HSU and RSU encoder blocks with each individually implementing logic to decide whether the clock input signals they receive from clock control circuit 40 are to be gated when not needed. Thus, as shown in FIG. 2, if I-only processing is to be performed by the encoder, an I-only processing signal 17 is asserted, e.g., I_only =1 (active), and the clock control circuit 40 will provide a host clock signal 41 and other signals to the I processing sub-unit 15, with clock signals provided to HSU and RSU sub-units being disabled. Likewise, in an HSU-only mode with motion estimation search being enabled, the HSU_only processing signal 27 is enabled, e.g., HSU_only =1, and the clock control circuit 40 will provide clock signals only to the HSU processing sub-unit 25, with clocks provided to the I and RSU partitions being disabled.

Figure 3:
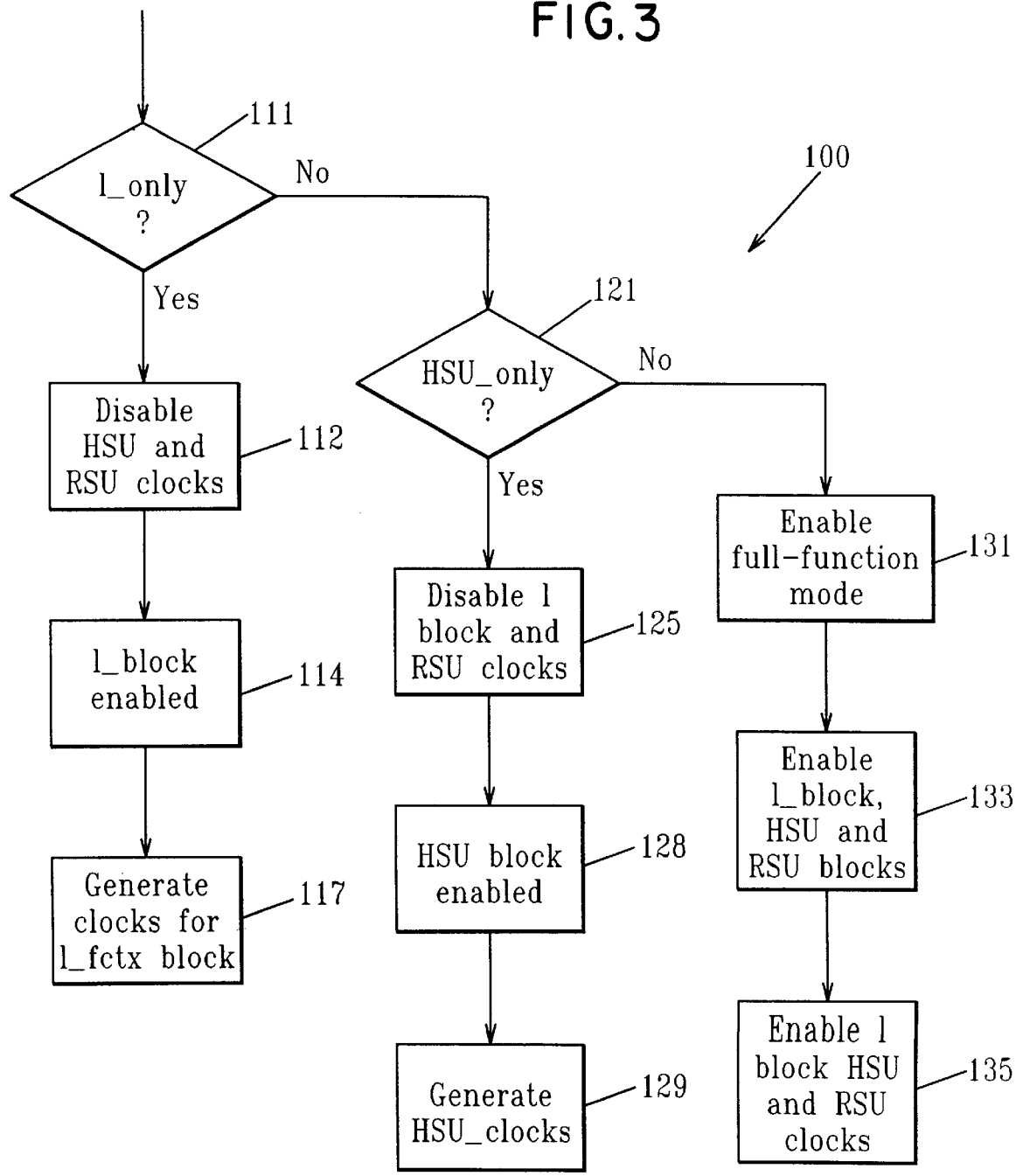
FIG. 3 is a flow chart exemplifying logic employed by clock control generation circuitry for enabling clock generation in specific functional video encoder blocks.

With additional reference being had to FIG. 2, the flow diagram shown in FIG. 3 encapsulates the logic 100 employed by the clock control circuit 40 for generating clock signals for each functional block. Generally, as shown at step 111, the intelligence provided in the clock control circuit first makes a decision as to whether an I_frame only signal 17 has been asserted indicating only MPEG intra-frame macro block processing. If the I_frame only signal has been asserted, then at step 112, the clock control circuit 40 disables the clocks to the HSU block 25 and RSU block 30, and, at steps 114 and 117 respectively enables I_block operation and generates clock signals for input to the I_block. If at step 111, it is determined that I_only processing had not been asserted, then at step 121 a determination is made as to whether the HSU_only signal 27 had been asserted indicating only MPEG hierarchical search processing. If the HSU_only signal 27 had been asserted, the clock control circuit 40 disables the clocks to the I_block 15 and RSU_block 30, and, at steps 128 and 129 respectively enables HSU_block operation and generates clock signals for input to the HSU_block 25. If at step 121, it is determined that HSU_only processing had not been asserted, then the process proceeds to step 131 to enable full-function MPEG encoder processing which entails enabling each of the I, HSU and RSU processing blocks at step 133 and enabling input to each respective block the I, HSU and RSU clocks, as indicated at step 135.

In a further embodiment, functional sub-units receiving clock signals in each of the I, HSU an RSU blocks, are designed to consume less power by receiving the clocks when the logic requires them, thus, minimizing the switching factor of the clocks and logic. Therefore, by disabling the clocks to each functional unit during its idle time, power consumption is significantly reduced. Specifically, some of the functional sub-units of the encoder typically exhibit active processing periods followed by idle periods. In a typical design, during the idle period, the clocks continue to switch using power in the clock circuits and the latches they drive. By anticipating both the bursts of activity and the idle period, the clocks can be disabled when not needed and enabled when they are needed.

Figure 4:
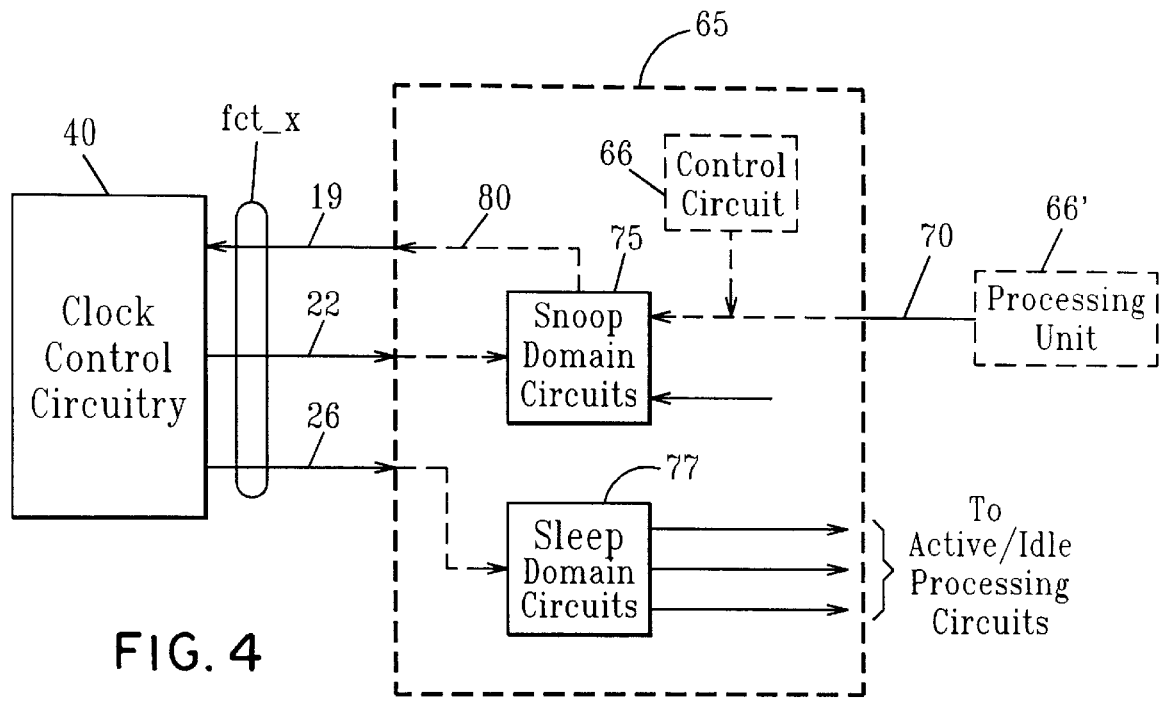
FIG. 4 is a diagram illustrating the clock and clock control signals required for reducing power consumption of a generic functional sub-unit that performs a specific task.

FIG. 4 illustrates a generic functional sub-circuit 65 from a functional block, e.g., I block, HSU or RSU blocks. This functional sub-circuit 65 contains circuitry for implementing a specific function, hereinafter referred to as function "X" wherein "X"=1, . . . , n implements a specific task. As shown in FIG. 4, functional sub-circuit 65 typically comprises a first domain of circuitry 75 and a second domain of circuitry 77 that differ in the following manner: the first domain of circuitry 75 contains flip-flop, latch and/or other digital logic circuitry, e.g., counters, (depending upon the specific function) that require a continuous clock input, such as clock signal 22 as long as the functional I, HSU or RSU block is enabled. First domain circuitry 75 functions to detect pending processing conditions or completion of a particular processing task. The second domain circuitry 77 contains that processing circuitry specific to the particular function and will be enabled at various times, when required. Thus, in order to reduce power consumption, a clock input 26 need only be enabled during active processing of second domain circuitry.

Referring to FIG. 4, first domain circuitry 75 requires a start trigger signal 70 which is a signal generated either internally, e.g., by a control circuit 66 contained within functional sub-circuit 65 or, externally, e.g., by an external processing unit 66', and which signal indicates that the sub-circuit 65 invoking a function "X" has data pending or, has completed its current task. For example, if data is pending, then trigger signal 70 may be at a first logic level, e.g., logic 1. Thus, in the case of video encode processing in I-block unit 15, signal 70 may indicate the start of macro block processing in some functional sub-units, or start of picture processing in other sub-units. If no new data is pending or the current task is completed or need not be performed, signal 70 may be at a second logic level, e.g., logic 0. As will be described in greater detail hereinbelow with respect to FIG. 10, the trigger signal may represent a zero pixel search window initiated by the RSU_block upon receipt of a zero motion vector, generated, for example, when still picture input video condition is detected, when a picture fade input video condition is detected, or, when a high bit rate is specified by the user of the 15 encoding system. Detection of such conditions will, in effect, disable clock signal 26 input to the second domain type circuitry of the various functional sub-units 65 in the HSU block as will be described below with reference to FIG. 6.

Referring to FIG. 4, the clock signal 22 input to the first domain circuitry 75 is herein referred to as a Snoop_Y_fctX_clk signal 22 which is active as long as the partition (Y=I, HSU, RSU functional blocks) to which it belongs is active, as determined by I_only or HSU_only signals, for example. This signal is used to detect the conditions when data required for a function X is pending or the function X task is complete. The logic employed by the clock control circuitry 40, is Snoop_Y_fctX_clk signal =f(osc) with Y indicating the particular functional block, i.e., I, HSU or RSU, and X indicating a specific function or task performed within the block.

In response to receipt of a Snoop_Y_fctX_clk signal 22 and the trigger signal 70, the first domain circuitry 75 generates a Sleep_Y_fctX signal 80 for input to that portion of clock control circuit 40 controlling the clock input 26 to the second domain circuits of that functional sub-unit. As described above, Y indicates an I, HSU or RSU functional block and X indicates the specific function or task as described above. Specifically, Sleep_Y_fctX signal 80 is generated in accordance with an active processing state of functional sub-unit X, or an inactive (idle) processing state of functional sub-unit X. When a functional sub-unit X is inactive, the Sleep_Y_fctX signal 80 is asserted and used by the clock control circuitry 40 to disable (gate) clock signal 26 input to the second domain type circuitry 77 performing function X, i.e., placing such circuits 77 in a "sleep" mode. This may occur for example, at the rising edge of the Snoop_Y_fctX_clk signal 22 in combination with assertion of the trigger signal 70 at logic 0. When a data processing task corresponding to function X has begun, the trigger signal 70 is applied to logic in first domain circuits 75 to generate the complement of the Sleep_Y_fctX signal 80 that is input to clock control circuit 40 and used to enable input of clock signal 26 to the second domain type circuits 77 placing such circuits 77 in an "active" processing mode. This may occur, for example, at the rising edge of the Snoop_Y_fctX_clk signal 22 in combination with assertion of the trigger signal 70 at logic 1.

Generally, for a processing functional block Y and a specific function or task X performed therein, second domain type clock signal 26 is referred to herein as Sleep_Y_fctX_clk. The logic implemented in the clock control circuitry 40 for enabling Sleep_Y_fctX_clk signal 26 is as follows:

Sleep_Y_fctX_clk =f(osc) AND not(Sleep_Y_fctX).

FIGS. 2 and 4 depict generally the combination of three signals Snoop_Y_fctX_clk, Sleep_Y_fctX, and Sleep_Y_fctX_clk that communicate between clock control circuitry 40 and a functional sub-block X in each of the I, HSU and RSU blocks. Each combination of signals is referenced as signals 18, 18' and 18" for respective I, HSU and RSU blocks.

Figure 5:
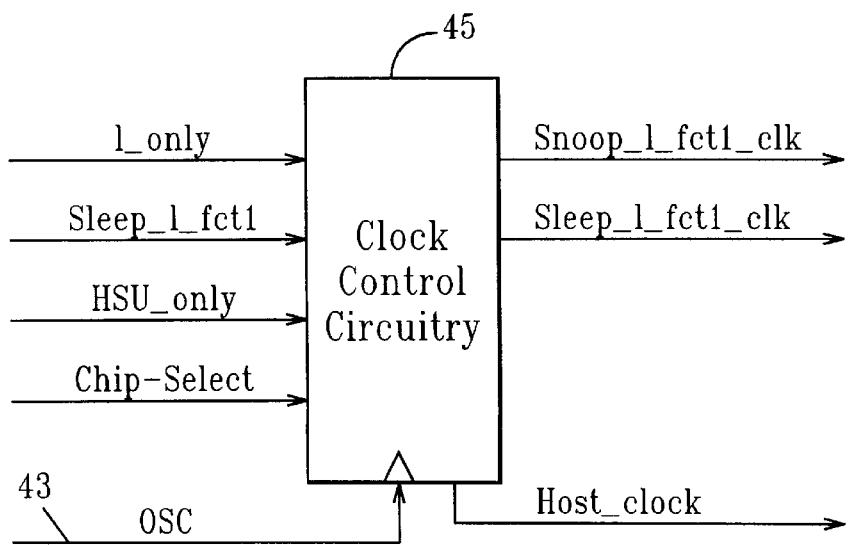
FIG. 5 is a diagram illustrating specific clock control circuitry for controlling function 1 processing of I_only type processing.

As shown in FIG. 5, for example, a portion of clock control circuitry 45 specific to a function "1" performed in an intra-frame macro block (I-block) processing sub-unit 65, will generate a Snoop_I_fct1_clk signal, which is a function of a free-running oscillator signal 43 running at, for example, 57 MHZ, and continuously asserted to provide timing for the first domain circuits 75 (FIG. 4). The logic implemented by clock control circuit 45 is as follows:

Snoop_I_fct1_clk signal =f(osc) AND not(HSU_only).
Likewise, Sleep_I_fct1_clk =f(osc) AND not(Sleep_I_fct1) AND not(HSU_only).

As mentioned above, MPEG-2 encoder applications may typically involve a motion estimation search function. In MPEG-2, this search is divided into two main functions: HSU-Hierarchical Search Unit Coarse (block 25, FIG. 2) and RSU-Refinement Search Unit (block 30, FIG. 2). The employment of power reduction in this embodiment is now explained in the following description of two types of HSU activity: 1) active picture processing; and, 2) search macro utilization. During active picture processing, activity in the HSU starts when picture data and commands are received and it ends when the last macro block of information has been sent to the RSU. Depending on picture size and search range, the time between pictures varies. It is during this idle time between pictures that most of the clocks for the HSU are disabled except for the Snoop_HSU_clk signal 32 as shown in FIG. 2. The snoop clock is responsible for detecting the conditions when the clocks should be enabled and disabled. Following the logic set forth above with respect to I_only processing, the snoop_HSU_clock signal 32 runs continuously as long as the I_only signal 17 is not asserted. Thus, if the sleep_HSU signal 29 is asserted by a sub-unit in the HSU circuitry 25, the sleep_HSU_clk 33 is gated in clock control circuit 40, e.g., during idle time between picture processing. For a specific processing function X, when its sleep_HSU_fctX signal is disabled, the sleep_HSU_fctX_clk signal is enabled and input to that second domain type circuitry in the HSU block 25 sub-units (not shown) for the active processing period.

Figure 6:
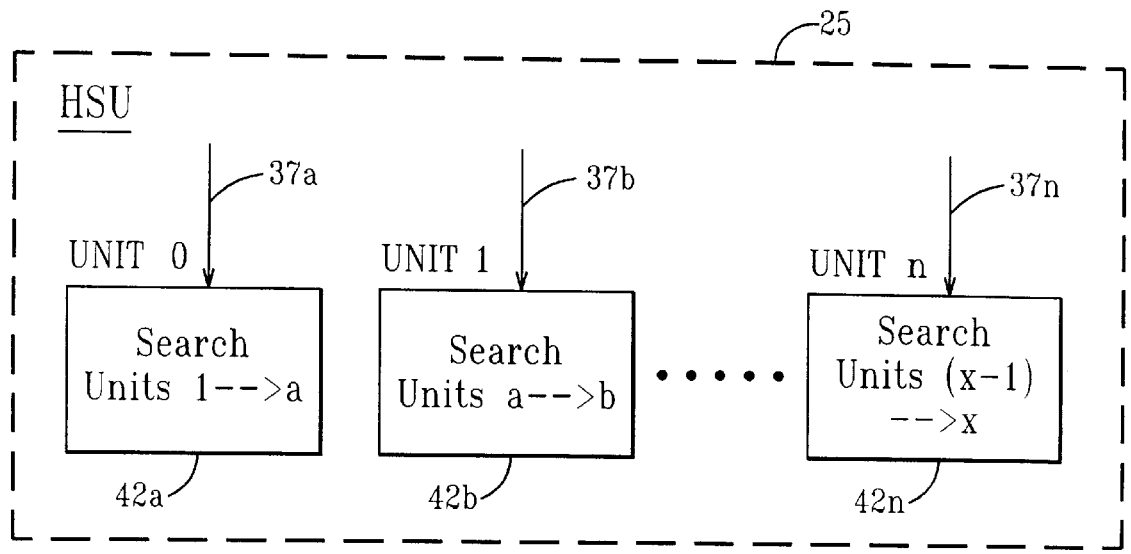
FIG. 6 illustrates specific control clocks generated for specific motion estimation search units.

In the second instance of search macro utilization, the HSU unit 25 can handle, e.g., up to ±-96 pixels horizontally per motion estimation chip. If the user only requires a search range of ±-63 pixels horizontally, the clocks to the hardware that are not involved in the search are disabled. Thus, as shown in FIGS. 2 and 6, the HSU block 25 will assert Use_search_z signals 34*a*, . . . , 34*n* which signals are input to the clock control circuitry 40 and with "z" representing search ranges 1, . . . , n. In response, the clock control circuitry 40 will generate a corresponding Search_z_clk signals 37*a*, . . . , 37*n* for input to the HSU block 25 for each Use_search_z signal asserted, with "z" representing the search ranges 1, . . . , n. As shown in FIG. 6, clock control circuitry 40 will generate Search_z_clk signals 37*a*, . . . , n depending upon the particular search units 42*a*, . . . , 42*n* being invoked for HSU motion estimation searching.

By way of further example, it may be determined that, upon certain conditions, significant power reduction in video encode circuitry may be achieved by eliminating or reducing motion estimation/compensation functions, and particularly, search operations performed in the HSU block. As previously mentioned, there are three conditions where motion compensation can be virtually eliminated: 1) detection of still input pictures; 2) detection of fade sequences; and 3) detection of high bit rates. Upon detection of any of these conditions, two methods may be utilized to effectively reduce/eliminate the motion estimation/compensation function. These methods are: 1) Forcing Zero Motion Vector for the Entire picture; and, 2) Forcing Zero Motion Vector for upper and lower bands of the picture.

Figure 10:
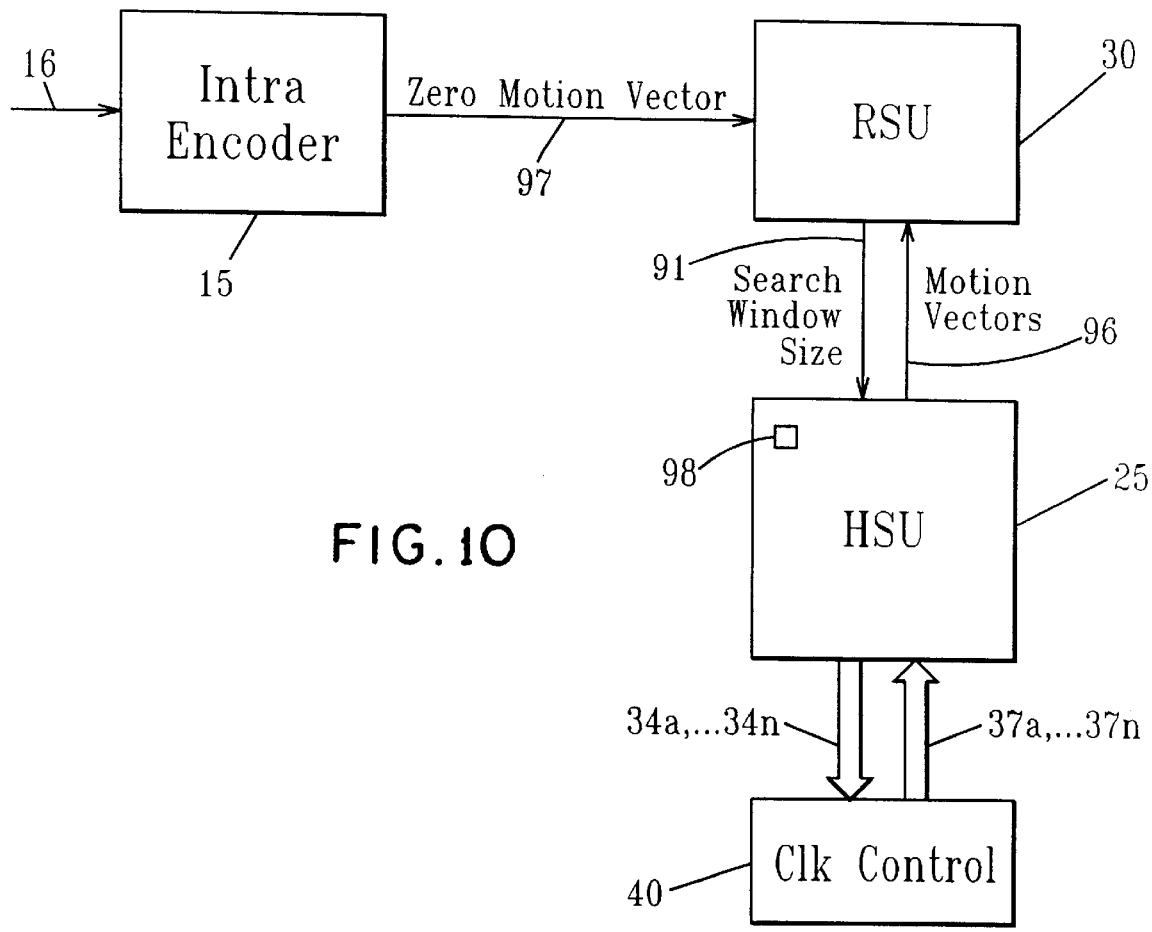
FIG. 10 illustrates video encoder power savings realized by the forced production of a zero motion vector upon detection of certain video input stream conditions.

With reference to FIG. 2, for the first condition, when an input video stream 16 is constant, i.e., comprises a series of still frames, there is no benefit to be gained from performing any type of motion estimation or compensation. That is because in a still sequence of video, the pixel data pattern contained within a given macro block will not change its position between subsequent frames of video, and thus a better match than the macro block located in the same position in a previous or future frame should not be able to be located. Power can be saved by identifying a still picture sequence, and reducing the motion estimation and compensation performed for the duration of the still sequence. Details of how the video encoder performs still picture detection and encoding can be found in commonly assigned, co-pending U.S. patent application Ser. No. 09/046,118 the whole contents and disclosure of which are incorporated by reference as if fully set forth herein. Generally, successive pictures of a still sequence are the same when both the luminance and chrominance data, or intensity, of each pair of pictures are the same with the exception of a small amount of noise. In addition, the variance of the same pixel across two pictures should be zero or very small if noise is present. To detect the presence of a still picture, a picture is first divided into an "X" number of bands which can be horizontal, vertical or different shapes. The pixels accumulated in each band is defined as the quantity "pix-summ". The accumulated absolute difference between pixels in adjacent pictures at the same location is called "pix-diff". A picture is considered a still picture if the criteria set forth in equations 1 and 2 are met:

$$\sum_{1}^{x} \left( (Pix\text{-}summ)_k - (Pix\text{-}summ)_{k+1} \right) < S_T \quad (1)$$

$$\sum_{1}^{x} \left( |Pix\text{-}diff|_k - |Pix\text{-}diff|_{k+1} \right) < S_T \quad (2)$$

where k is a picture number, x represents the picture bands, and $S_T$ represents an experimentally derived still threshold, e.g., 256 for NTSC size pictures. in view of FIGS. 10, 11(*a*) and 11(*b*), upon detection of a still picture video input, the I_block 15 will either generate a zero motion vector 97 which is used to restrict the motion search range to the macro block size for a still picture and enable temporary suspension of HSU search engine processing, or, will generate a zero motion vector for specific bands of the picture, e.g., the upper and lower bands, considerably reducing the amount of search engine processing for a given period.

With reference to FIG. 2, for the second condition, when an input video stream 16 exhibits a fade characteristic (e.g. video-to-black or black-to-video), the encoded quality will suffer by allowing the motion estimation/compensation hardware to search for a best reference macro block on a past or future frame if the reference is from a different scene. Not only will power be wasted in performing such a search, but poor video quality may result by inadvertently selecting a poor macro block as a reference. Thus, when a fade sequence is detected, the motion estimation/compensation effort can be reduced or eliminated, resulting in not only a power savings but improved picture quality. Details of how the video encoder performs a fade picture detection can be found in commonly assigned, co-pending U.S. patent application Ser. No. 09/046,290 now U.S. Pat. No. 6,040,875, the whole contents and disclosure of which are incorporated by reference as if fully set forth herein. Generally, the method for fade sequence detection involves concurrently sending uncompressed video input to a fade detection unit having a hardware driven fade band and sum calculation processor (not shown). In this processor, each individual picture frame of the input video is divided into field bands and the luminance and chrominance pixel values for each pixel of each picture frame are summed in the manner as described in co-pending U.S. patent application Ser. No. 09/046,290 now U.S. Pat. No. 6,040,875. Then, a special purpose encoder (not shown) makes a comparison between the current picture frame and the previous picture frame and makes the fade determination based upon the bands/sums information calculated for each frame. During a fade, the preference is to bias the current macro block to be an intra macro block, ensuring that it will become a good reference for subsequent frames. Upon detection of a fade sequence, an adjustment is made to force the motion estimation engine (HSU block) of the video compression encoder to use a zero motion vector for all macro blocks in a fade picture and restrict the motion search range. This will ensure that the motion estimation engine does not select some non-zero vector pointing to a local minimum best match macro block that is not really as good a match as a zero motion vector reference macro block.

For the third condition, under the circumstances where a high video encode bitstream rate is specified by the user of the encoding subsystem, it is possible that more than enough bits might be available to easily encode the input video sequence, usually, resulting in the encoder having to pad the bitstream with 0's to ensure that the output bit rate does not dip too far below that specified by the user. Details of how this is achieved can be found in greater detail in commonly assigned, co-pending U.S. patent application Ser. No. 08/965,746 the contents and disclosure of which are incorporated by reference as if fully set forth herein. However, according to the invention, an alternative to padding in such a situation is to reduce or eliminate the motion estimation/compensation performed such that more bits are consumed in encoding the picture. This will reduce the amount of padding necessary at the end of each picture and reduce the power consumed by the HSU and RSU. Generally, as described in co-pending U.S. patent application Ser. No. 08/965,746, the method of detecting and reacting to a high bit rate situation involves monitoring the fullness of a video buffer verifier "VBV" (not shown) and upon detection of exceeding a VBV threshold level for the particular encode rate, modifying the motion estimation process, e.g., by reducing the motion estimation processing time, i.e., forcing a zero motion vector for the current frame of a frame sequence.

Typical MPEG-2 compliant encoding subsystems require that a user specify a search window representing the number of pixels in the horizontal and vertical dimensions around the current macro block that the motion estimation/compensation hardware should search for a best match reference macro block. By forcing both the HSU and RSU to use a Zero Motion Vector, the search hardware and some of the control logic in the HSU can have its clocks turned off, and the RSU can be constrained to refine its search only around the macro block's original position.

According to the invention, as shown in FIG. 10, upon detection of any of these three conditions, the I_block 15 will force the generation of a zero motion vector 97 for input to the RSU_block 30 which implements logic for generating a trigger signal 91 representing a zero search window size, i.e., ±/-0 pixels horizontal and ±/-0 pixels vertical, for the HSU search unit 25. This indicates that each macro block is only going to be compared to the macro block in the same position in the reference picture in the HSU block. As shown in FIG. 10, first domain type processing detection circuitry 98 in one or more functional sub-blocks of the HSU_block 25 will detect this trigger signal 91, effectively treating it as an indication of idle processing, and, in the manner described herein with reference to FIGS. 4 and 6, generate one or more Sleep_HSU_fctX signals for input to clock control circuit 40 to initiate the gating of clock signals 37a, ..., 37n to all of the functional sub-units 42a, ..., 42n that perform macro block searching in the HSU_block. Likewise, some of the control logic in the HSU_block can have its clocks turned off. Referring back to FIG. 10, when in zero motion vector mode, the HSU_block 25 will return zero motion vector signals 96 and zero difference data to the RSU_block 30 for refinement, and the RSU_block is constrained to refine its search only around the macro block's original position, i.e., the zero location, thus, greatly limiting the searching required by the motion hardware, and resulting in appreciable power savings. This process will repeat for all macro blocks of the current picture. It should be understood that the three conditions for forcing zero motion vectors as described herein are illustrative only, and in no way limiting as other conditions may be detected which may trigger zero motion vector processing.

Figure 11A:
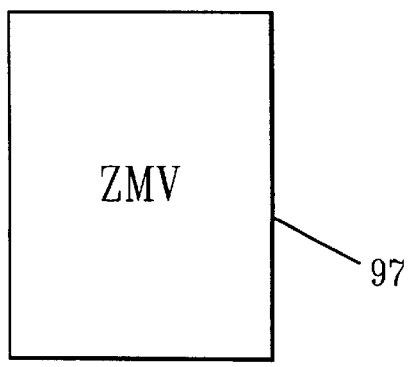
FIGS. 11(a) and 11(b) respectively illustrate production of a zero motion vector and a regional zero motion vector.
Figure 11B:
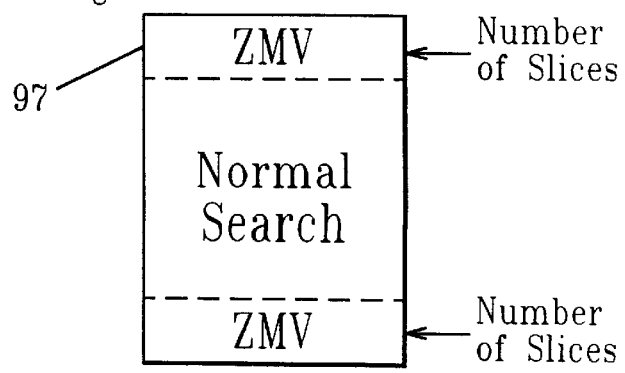

In accordance with the second method for reducing the amount of motion estimation/compensation and thus power consumption, a zero motion vector is generated for only a portion of the current field or frame, corresponding to bands of slices at the top and bottom of the field or frame. FIGS. 11(a) and 11(b) conceptually illustrate both zero motion vector 97 for the entire picture as well as zero motion 97' for regions at the top and bottom of the picture. In the second mode, the RSU_block sets the HSU_block up to perform a zero search several macro blocks, for example, prior to the start of each zero motion vector slice region. The zero search takes affect at the beginning of the next slice. Similarly, the RSU_block sets the HSU_block back to the normal search window size, for example, a few macro blocks prior to the end of the zero motion vector region; the change taking effect at the beginning of the next slice. The HSU in turn responds as previously described to a zero search window, resulting in reduced power consumption in the zero motion regions by the search engine.

Figure 1:
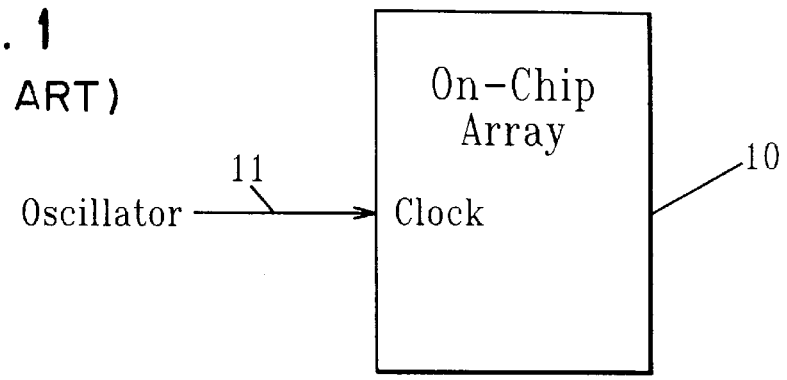
FIG. 1 is an illustration of an on-chip array circuit of the prior art having a free-running clock input.
Figure 7A:
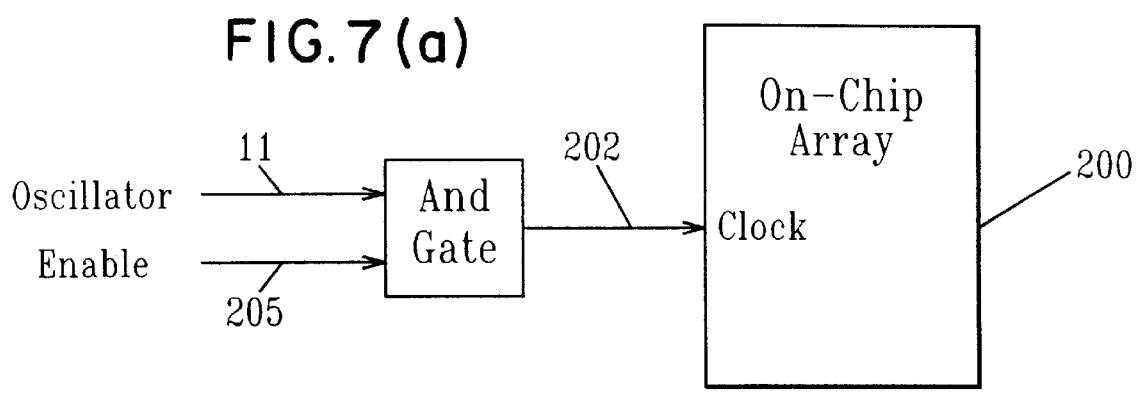
FIGS. 7(a) and 7(b) illustrate the implementation of logic circuitry to prevent free running oscillator from transitioning respective active high and active low on-chip memory array nodes.
Figure 7B:
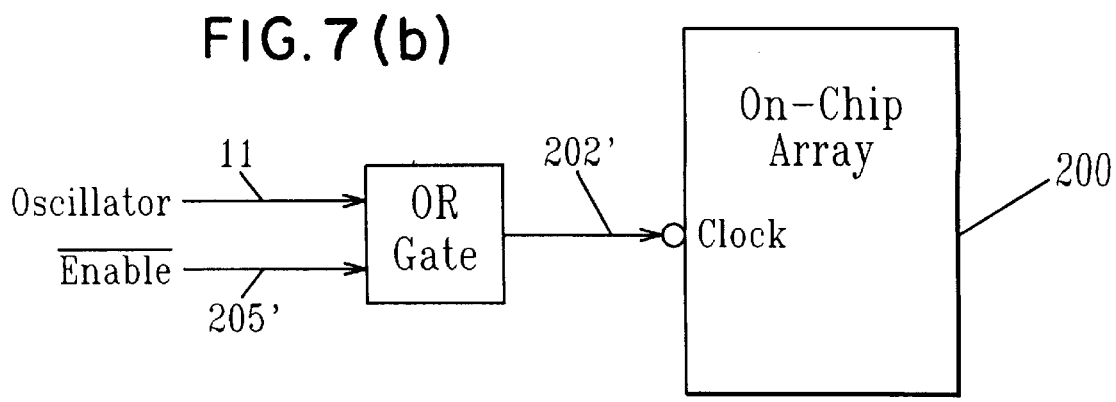

As mentioned above with reference to FIGS. 1 and 2, in the video encoder 12, on-chip memory arrays 10 are provided in the I, HSU and RSU functional blocks and in sub-units therein. In a further embodiment to realize a power reduction of on-chip memory gates, means is provided to allow the array clock to transition only during those cycles in which an array operation requiring a clock is desired to be performed. One method to accomplish this is shown in FIG. 7(a) which illustrates an on-chip array 200 having a positive active clock input 202. An 'enable' signal 205 is generated by the particular encoder block having the on-chip memory array only during those cycles in which an array operation requiring a clock is desired to be performed. This enable signal 205 is then logically AND'd with the system oscillator 11, and fed to the clock input of the on-chip array element 200. The resultant gated clock will only transition when needed, obviating unnecessary internal array node transitions and thus reducing unnecessary power dissipation. Necessarily, for arrays implementing a positive active clock input 202, the generated enable signal will be at a logic '1' value. For on-chip arrays with negative active clock inputs 202', a similar approach is employed. That is, the "enable" signal 205 mentioned previously is created, and its inverse signal 205' is logically OR'd with the oscillator 11, as shown in FIG. 7(b) to help reduce unnecessary power dissipation.

Similar to the unnecessary dissipation of power due to a free running array clock, the transition of array data and address lines during cycles when the array is not read or written to causes some array internal node switching. This internal node switching and its accompanying power dissipation is reduced by ensuring that the array address and data inputs are quiesced during those cycles when a read or write is not being performed.

Figure 8:
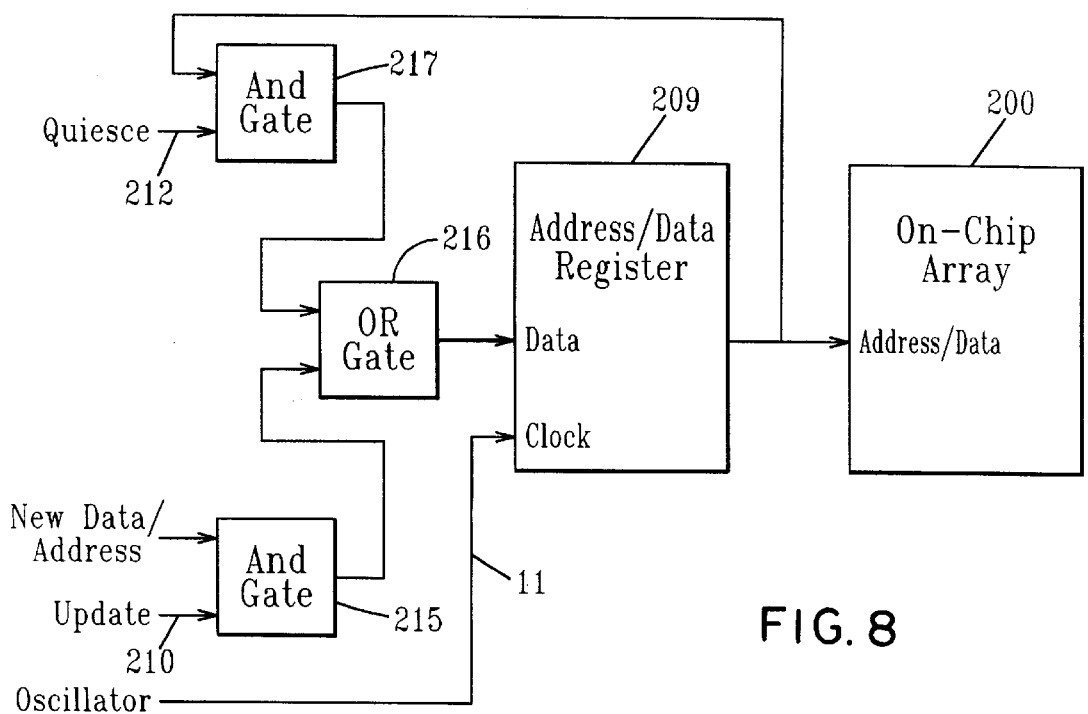
FIG. 8 illustrates specific control signals implemented for gating address/data intended for the on-chip memory array.

FIG. 8 shows a method for performing this quiescence for a functional sub-unit containing on-chip array 200 receiving address/data information via an address/data register 209 receiving free running oscillator signal 11. As shown in FIG. 8, logic is employed by the functional unit x to generate an 'update' signal 210 that is at a logical '1' only when the array address and/or data inputs for on-chip array 200 need to be updated for the next read or write operation. A second 'quiesce' signal 212 that is simply the inverse of the 'update' signal, is generated that is a logical 1 when such an update is not necessary. The circuit shown in FIG. 8 uses these two control signals 210 and 212 to select whether the address and data registers feeding the array address and data inputs should be updated with new values or hold their previous values. As an example, when the update signal 210 is a logic 1, and the quiesce signal 212 is logic '0', AND gates 215, 217 and OR gate 216 will allow the new address/data to be input to the address/data register 209 for update. When the quiesce signal 212 is a logic 1, and the update signal 210 is logic '0', the current address/data values at the address/data register will be held. This mechanism will prevent unnecessary updating of the address and data input registers during those cycles when the array is not to be accessed, and will result in a power savings due to reduced array internal node transitioning.

It should be understood that, the update/quiesce signals 210, 212 are generated by the individual sub-units implementing functions in the I, HSU and RSU functional blocks containing the specific on-chip array instances as these signals generally require other signals already available in the specific sub-unit, and not available in the clock controls.

Figure 9:
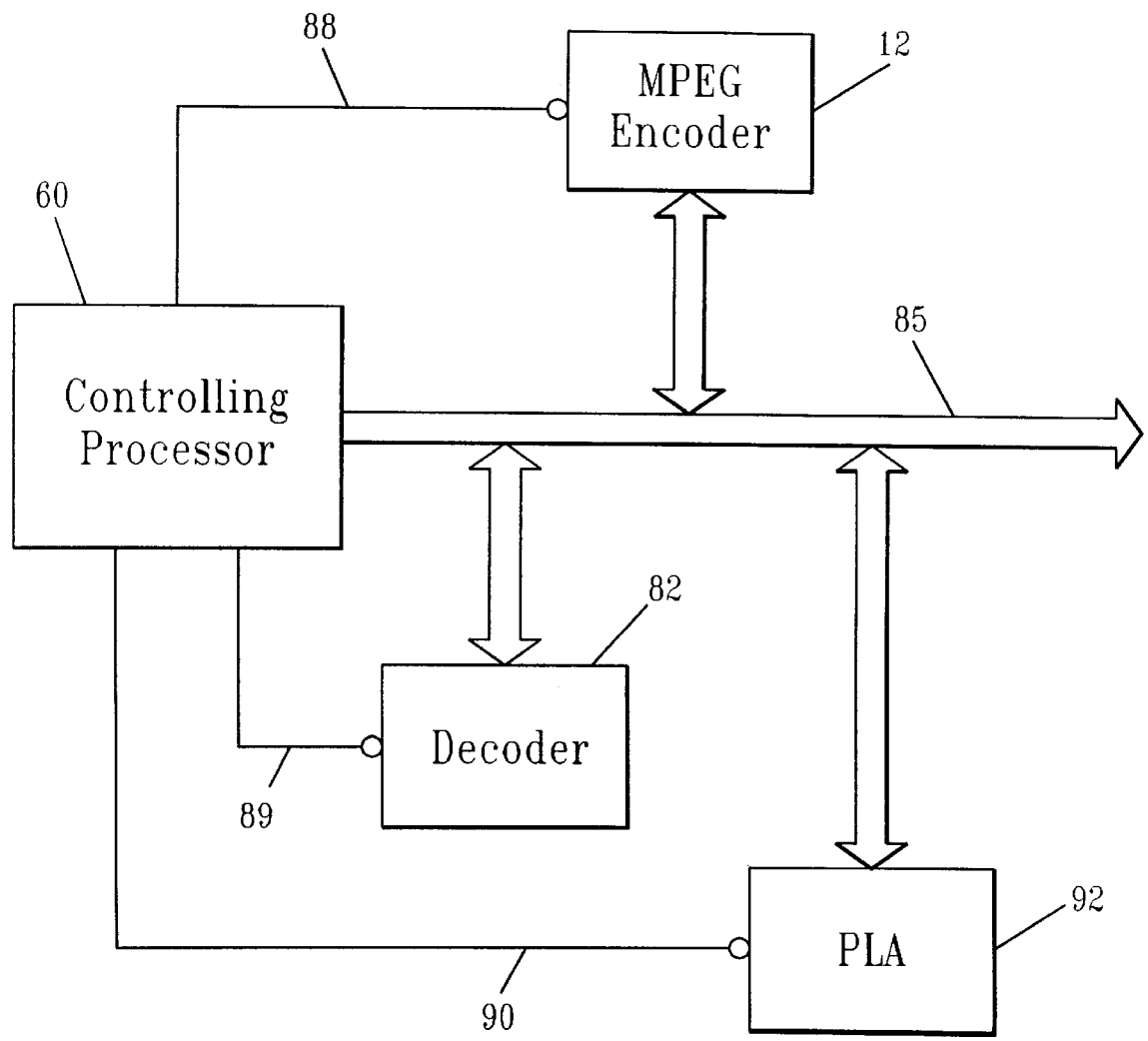
FIG. 9 illustrates the input of chip select signals used to control the input of clock signals to various device components.

In the encoder chip 12, a host interface is provided containing components that are controlled by a chip_select signal issued by a controlling processor such as processor 60 shown in FIG. 9. As shown in FIG. 9, the controlling processor 60 will assert chip select signals 88, 89 and 90 to enable respective functionality of MPEG encoder device 12, decoder device 82, or programmable logic array device 92 or such equivalent. A host bus 85 providing address and data information for each of these components is provided and controlled by the processor unit 60.

As shown in FIG. 9, the host interface bus 85 is shared between components 82 and 92 in addition to the MPEG encoder 12. Since it is a shared bus, signal switching that is NOT meant for the MPEG encoder device is also received. By disabling the clocks to the host interface while a chip select is not asserted, the encoder doesn't respond to switching on the shared bus, thus reducing the power consumption.

Particularly, during processor read and write operations to any component on the card, the host bus 85 may have information that is intended only for one device. The use of the chip select signal CS notifies each component if the host bus data is meant for it. If the data on the bus is changing, power is consumed even if the data is not meant for a particular unit. In this embodiment, the CS signal is used to decide if that interface is to receive the clocks thereby blocking any host activity meant for another component. Thus, with reference to FIG. 5, logic is employed by that portion 45 of clock control circuitry 40 controlling I_only block processing to enable generation of the host clock for the I block as follows:

Host_clck =f(osc) AND not(HSU_only) AND not (Chip_Select)

It is understood that each component 12, 82 and 92 contains logic circuitry that processes the chip select signal input thereto to determine if the individual clock circuit therein is to be enabled. As the chip select signal CS is active low, information on the host bus 85 is meant for that chip-enabled component, and the clock circuitry will be enabled. If the chip select signal CS is high, that is, information on the bus is not meant for that particular device, then the clock circuitry will be disabled.

While the invention has been particularly shown and described with respect to illustrative and preformed embodiments thereof, it will be understood by those skilled in the art that the foregoing and other changes in form and details may be made therein without departing from the spirit and scope of the invention which should be limited only by the scope of the appended claims.

What is claimed is:

1. A method for reducing power consumption in video encoder circuitry having functional sub-units including active processing circuitry receiving first clock signals, said method comprising the steps of:

generating a first signal indicating an idle processing period for a functional sub-unit;

providing in said functional sub-unit a processing detection means for receiving said first signal and generating a second signal indicating either active processing periods in said functional sub-unit or idle processing periods in said functional sub-unit in accordance with said received first signal;

disabling said first clock signals from said active data processing circuitry in response to said second signal when indicating an idle processing period, while enabling a second clock signal to be input to said processing detection circuitry; wherein power consumption in said active data processing circuitry is reduced during said idle processing periods.

2. A method as claimed in claim 1, wherein said second signal is a function of said first signal and a state of said processing detection means.

3. A method as claimed in claim 2, wherein said processing detection means includes flip-flop circuitry, said second clock signal controlling said flip-flop circuitry to detect a data pending processing condition.

4. A method as claimed in claim 3, wherein said second clock signal is used to control flip-flop circuitry within said functional sub-units to detect completion of a data processing task.

5. A method as claimed in claim 2, wherein said processing detection means includes digital logic circuitry operating under control of said second clock signal, said digital logic circuitry being used to detect a data pending processing condition.

6. A method as claimed in claim 1, further including the step of generating a third signal indicating only macro-block video encode processing by a macro-block processing unit only, or a fourth signal indicating motion estimation search video encode processing by one or more motion estimation search units only, said second clock signal further being a function of either said third or fourth signals.

7. A method as claimed in claim 1, wherein said video encoder circuitry includes processor means for controlling video encoder data processing operations, said processor means generating a chip select signal to enable transmission of address and data information from said processor to one or more macro-block processing units and one or more motion estimation search units.

8. A method as claimed in claim 7, further including the step of generating a third clock signal for use by interface circuitry contained in a macro-block processing unit, said third clock signal being a function of said second clock signal and said chip select signal.

9. A method as claimed in claim 1, wherein said video encoder circuitry further comprises active data processing circuitry including on-chip memory elements controlled by an oscillator input signal, said method including the step of generating an enable signal to prevent said oscillator input signal from being input to said on-chip memory elements and reduce power dissipation thereof between data read and/or a data write memory operations.

10. A method as claimed in claim 1, wherein said video encoder circuitry further comprises active data processing circuitry including address and data registers, said method including the step of quiescing new address and data inputs to respective address and data registers during absence of read or write operations.

11. An apparatus for reducing power consumption in video encoder circuitry having at least one intra-frame macro-block processing unit and one or more motion estimation search units, each said macro-block processing unit and one or more motion estimation search units including active data processing circuitry, said apparatus comprising:

means for generating a first signal indicating an idle processing period for particular video encoder circuitry;

processing detection means provided in said at least one intra-frame macro-block processing unit and one or more motion estimation search units for receiving said first signal and generating a second signal indicating active processing periods in a respective one of said macro-block processing unit and one or more motion estimation search units or, idle processing periods in one of said macro-block processing unit and one or more motion estimation search units in accordance with said received first signal;

clock control means for generating first clock signals for use by said active data processing circuitry, and second clock signals for use by said processing detection means, said clock control means including means responsive to said second signal for preventing said first clock signals from being input to said active data processing circuitry while enabling a second clock signal to be input to said detection means; and means responsive to said detection means and said first signal for enabling input of said first clock signals to said active data processing circuitry during data processing activity, whereby power consumption is reduced in said active data processing circuitry during said idle periods.

12. An apparatus as claimed in claim 11, wherein said second signal is a function of said first signal and a state of said processing detection means.

13. An apparatus as claimed in claim 12, wherein said processing detection means includes flip-flop circuitry, said second clock signal controlling said flip-flop circuitry to detect a data pending processing condition.

14. An apparatus as claimed in claim 13, wherein said second clock signal controls said flip-flop circuitry to detect completion of a data processing task.

15. An apparatus as claimed in claim 12, wherein said processing detection means includes digital logic circuitry operating under control of said second clock signal, said digital logic circuitry being used to detect a data pending processing condition.

16. An apparatus as claimed in claim 11, further including means for providing a third signal indicating macro-block video encode processing by said macro-block processing unit only, or providing a fourth signal indicating motion estimation search video encode processing by said one or more motion estimation search units only, said second clock signal further being a function of either said third or fourth signals.

17. An apparatus as claimed in claim 11, wherein said video encoder includes processor means for controlling video encoder data processing operations, said processor means generating a chip select signal to enable transmission of address and data information from said processor to one of said macro-block processing unit and one or more motion estimation search units.

18. An apparatus as claimed in claim 17, further including means for generating a third clock signal for use by interface circuitry contained in said macro-block processing unit, said third clock signal being a function of said second clock signal and said chip select signal.

19. An apparatus as claimed in claim 11, wherein said active data processing circuitry includes on-chip memory elements controlled by an oscillator signal, said apparatus further including means for generating an enable signal to prevent said oscillator signal from being input to said on-chip memory elements to thereby reduce power dissipation thereof between read and/or write on-chip memory operations.

20. An apparatus as claimed in claim 11, wherein said active data processing circuitry includes address and data registers, said apparatus including means for quiescing new address and data inputs to respective address and data registers during absence of read or write operations.

21. An apparatus as claimed in claim 11, wherein said first signal indicates receipt of a zero motion vector received by one or more motion estimation search units, said zero motion vector being generated upon detection of a still picture input to said video encoder circuitry.

22. An apparatus as claimed in claim 11, wherein said first signal indicates receipt of a zero motion vector received by one or more motion estimation search units, said zero motion vector being generated upon detection of a fade picture input to said video encoder circuitry.

23. An apparatus as claimed in claim 11, wherein said first signal indicates receipt of a zero motion vector received by one or more motion estimation search units, said zero motion vector being generated upon selection of high video encode bitstream rate for a given input video stream.

24. A power consumption reduction system for a video encoder having at least one intra-frame macro-block processing unit and one or more motion estimation/compensation search units, each said one or more motion estimation/compensation search units including active data processing circuitry receiving first clock signals, said system comprising:

(a) means for detecting a pre-defined condition of an input video stream to be encoded;

(b) means responsive to detection of said pre-defined condition for forcing the generation of a zero motion vector signal associated with a current video frame, said zero motion vector signal being input to at least one of said motion estimation search units, (c) means located in a said motion estimation/compensation search unit responsive to said input zero motion vector signal for generating a first signal indicating a zero motion estimation/compensation search function;

(d) processing detection means provided in said motion estimation/compensation search unit and requiring continuous input of second clock signals for operation thereof, said processing detection means generating one or more second signals indicating a reduction of active processing in one or more motion estimation/compensation search units in accordance with said received first signal; and, (e) clock control means for receiving said one or more second signals and preventing said first clock signals from being input to said active data processing circuitry for an active video frame processing period, while enabling continuous input of second clock signals to said processing detection means, whereby power consumption is reduced in said one or more motion estimation/compensation search units during said active video frame processing period.

25. A system as claimed in claim 24, wherein said pre-defined condition of an input video stream is a fade picture input stream.

26. A system as claimed in claim 24, wherein said pre-defined condition of an input video stream is a still picture input stream.

27. A system as claimed in claim 24, wherein said pre-defined condition of an input video stream is a high bitstream rate output corresponding to said input video stream.

* * * * *